(No Model.)
J. DANZ, Jr.
DECOY.
No. 311,877. Patented Feb. 10, 1885.
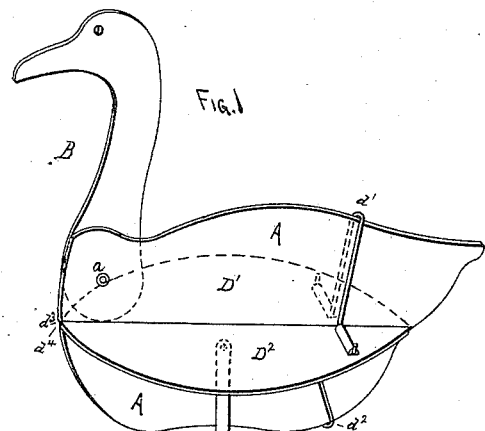
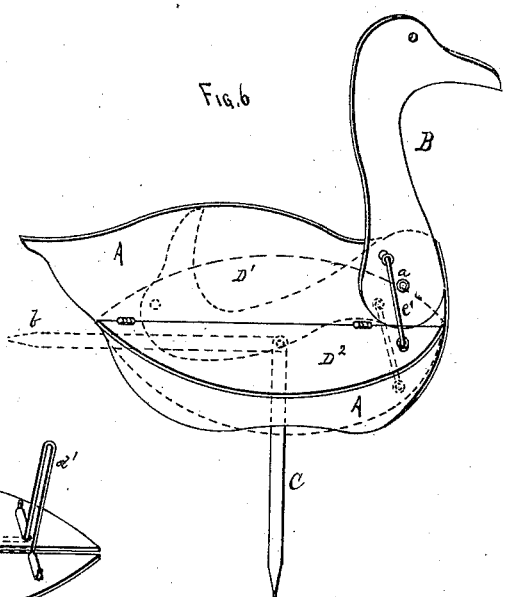
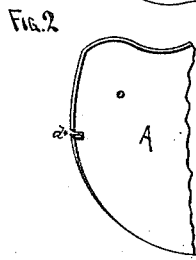
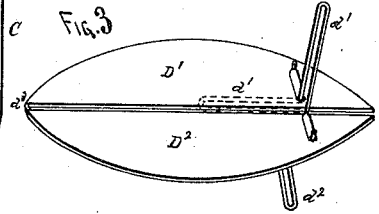
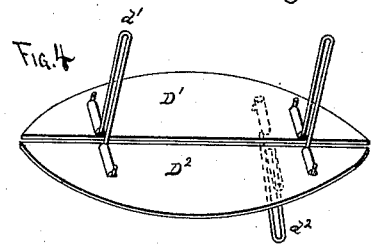
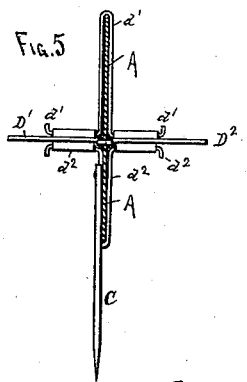
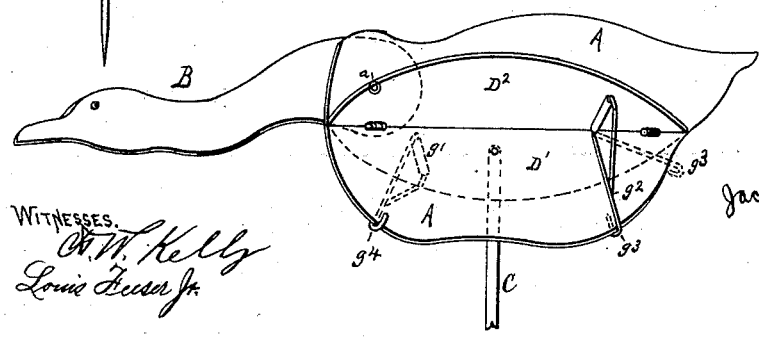

UNITED STATES PATENT OFFICE.

JACOB DANZ, JR., OF ST. PAUL, MINNESOTA.

DECOY.

SPECIFICATION forming part of Letters Patent No. 311,877, dated February 10, 1885.

Application filed February 15, 1884. (No model.)

*To all whom it may concern:*

Be it known that I, JACOB DANZ, Jr., a citizen of the United States, and a resident of St. Paul, in the county of Ramsey, in the State of Minnesota, have invented certain new and useful Improvements in Decoys, of which the following specification is a full, clear, and exact description, reference being also had to the accompanying drawings, in which—

Figure 1 is a perspective view of one of the decoys, showing one manner of attaching the side wings or plates. Fig. 2 is a perspective view of a portion of the "breast" of one of the decoys. Figs. 3 and 4 are views of two forms of the auxiliary side plates detached. Fig. 5 is a cross-sectional view of the same. Fig. 6 is a perspective view of a decoy, illustrating the manner of attaching and folding the neck and stake of the decoy. Fig. 7 is a perspective view, showing a neck of different form from that shown in Figs. 1 and 6, and in a different position.

This invention relates to decoys used by hunters in luring ducks, geese, &c., within range of their guns; and it consists in the special devices hereinafter described and claimed.

In the drawings I have shown the decoys formed to represent the outlines of geese, but they may be formed to represent ducks or any other birds.

A is the body or profile, and B the neck and head pivoted at $a$ to the body, and adapted to fold down alongside the body when not in use, so as to occupy less space in transporting from place to place.

C is a pointed stake or rod pivoted at one end to the profile A, and adapted to be folded up, as shown by dotted lines at $b$ in Fig. 6, when the decoys are being transported, or turned downward and inserted into the ground to support the decoys, as shown in Figs. 1, 5, and 6, when they are in use. Both the folding necks and folding stakes will be supplied with means for holding them in whatever position it is desired they shall assume. The profiles and necks will be painted to resemble geese, ducks, &c., and when viewed from the side very closely resemble live birds; but to render them equally as deceptive when looked at from above, and at the same time add little or nothing to their bulk, there are attached to each side of the profile A, at any desired angle thereto, auxiliary plates or wings $D' D^2$, of the same or similar material as the profiles, and cut to represent the body of the bird when viewed from above, and painted to represent the back of the bird. By this arrangement the decoy has the solid rounded appearance of the live bird from all points of observation, while at the same time, being formed of thin material, a large number of them can be easily packed in a very small space for transportation. The plates $D' D^2$ may be provided, for the purpose of attachment to the profile A, either with large wire loops $d'$ $d^2$, to fit over the back and beneath the lower part of the profile, and a small loop, $d^3$, to fit into a notch, $d^4$, in the breast, as shown in Figs. 1, 2, 3, and 5, or with two of the loops $d'$, to fit over the back, and one or more to fit beneath the profile, as in Fig. 4, the large loops being made to fold down upon the wings $D' D^2$, as shown in dotted lines in Fig. 3, when not in use, and as shown in Fig. 7.

Fig. 6 shows the side plate hinged to the body; but this is not my invention.

The necks B on the different decoys of a set are to be shown in different positions to represent the birds as in the act of feeding, drinking, watching, sleeping, &c., to impart a still more life-like appearance to the flock.

In Figs. 1 and 6, for example, the necks are shown erect, while in Fig. 7 the neck is shown bent to represent the bird in the act of feeding, &c. The loops $d'$ will be sufficient to support the wings upon the profiles; but by adding the under loops $d^2$ they will be more firmly held, and not be liable to be displaced by the wind blowing up from beneath them.

The wings may be arranged at right angles to the profiles, or at a slightly-drooping angle, as preferred.

Having described my invention and set forth its merits, what I claim is—

1. In a decoy, the combination, with the vertical profile-plate A, of removable wing-plates $D' D^2$, secured to the profile-plate by loops $d' d^2$, substantially as and for the purpose herein specified.

2. A decoy composed of a vertical profile-plate, A, neck and head plate B, and stake C, pivoted thereto, and removable wing-plates D' D², substantially as and for the purpose herein specified.

3. A decoy provided with a set of interchangeable necks, B B, of different forms, representing different positions or attitudes of birds, substantially as and for the purpose herein specified.

In testimony whereof I have hereunto set my hand in presence of two subscribing witnesses.

JACOB DANZ, Jr.

Witnesses:
C. N. WOODWARD,
LOUIS FEESER, Sr.